(12) United States Patent
Hanajiri et al.

(10) Patent No.: US 9,351,502 B2
(45) Date of Patent: May 31, 2016

(54) OXIDIZED AND PARTIALLY HYDROGENATED OIL OR FAT

(71) Applicant: J-OIL MILLS, INC., Tokyo (JP)

(72) Inventors: Tsutomu Hanajiri, Tokyo (JP); Masahiro Arai, Tokyo (JP); Akihiro Nakatani, Tokyo (JP); Hiroatsu Hagiri, Tokyo (JP)

(73) Assignee: J-Oil Mills, Inc., Tokyo (JP)

( * ) Notice: Subject to any disclaimer, the term of this patent is extended or adjusted under 35 U.S.C. 154(b) by 0 days.

(21) Appl. No.: 14/185,048

(22) Filed: Feb. 20, 2014

(65) Prior Publication Data

US 2015/0230490 A1  Aug. 20, 2015

(30) Foreign Application Priority Data

Aug. 24, 2011 (JP) ................. 2011-182095

(51) Int. Cl.
| | |
|---|---|
| A23D 9/04 | (2006.01) |
| A23L 1/40 | (2006.01) |
| A23D 9/00 | (2006.01) |
| A23D 9/02 | (2006.01) |
| A21D 2/16 | (2006.01) |
| C11C 3/00 | (2006.01) |
| C11C 3/12 | (2006.01) |

(52) U.S. Cl.
CPC ........ *A23D 9/04* (2013.01); *A21D 2/165* (2013.01); *A23D 9/00* (2013.01); *A23D 9/02* (2013.01); *A23L 1/40* (2013.01); *C11C 3/006* (2013.01); *C11C 3/123* (2013.01)

(58) Field of Classification Search
None
See application file for complete search history.

(56) References Cited

U.S. PATENT DOCUMENTS

| | | | | |
|---|---|---|---|---|
| 5,064,670 A | * | 11/1991 | Hirshorn et al. ............ | 426/607 |
| 5,885,643 A | * | 3/1999 | Kodali et al. ............... | 426/601 |
| 6,159,525 A | * | 12/2000 | Lievense et al. ............ | 426/603 |
| 6,160,140 A | * | 12/2000 | Bhaggan et al. ............ | 554/126 |
| 2006/0178521 A1 | * | 8/2006 | Rubin et al. ................ | 554/126 |
| 2007/0141220 A1 | * | 6/2007 | Lee .......................... | A21D 2/16 426/601 |

FOREIGN PATENT DOCUMENTS

| | | | |
|---|---|---|---|
| JP | 2009089684 A | | 4/2009 |
| JP | 2010099037 A | | 5/2010 |
| JP | 2011093961 A | | 5/2011 |
| JP | 2011115149 A | | 6/2011 |
| KR | WO01/98445 | * | 12/2001 |
| KR | WO01/56395 | * | 8/2015 |

OTHER PUBLICATIONS

Giva, L. et al. 2013. Food Chemistry 140:680.*
Jung, Mi Ok et al. 2002. JAOCS 79(5)501.*
Swern, D. 1979. Bailey's Industrial Oll and Fat Products, vol. 1, 4th edition. John Wiley & Sons, New York. p. 429-432.*
Warner, K. 2008. "Food Uses for Soybean Oil and Alternatives to Trans Fatty Acids in Foods." Johnson, L. A. White, P. J. Galloway, R. Eds. Soybeans—Chemistry, Production Processing, and Utilization, vol. 2—15.3.2 Deep-Fat Frying. AOCS Press. pp. 483-496.*
Ratnayake, "Analysis of Dietary Trans Fatty Acids", J. Oleo Sci., vol. 50, No. 5 (2001), pp. 339-352.
International Search Report, PCT/JP2012/059146, Jun. 20, 2012, 2 pages.

* cited by examiner

*Primary Examiner* — Nikki H Dees
(74) *Attorney, Agent, or Firm* — Edell, Shapiro & Finnan, LLC

(57) ABSTRACT

An oil or fat composition described herein has a hydrogenated aroma and flavor as a conventional oil or fat composition and a long lasting hydrogenated aroma, while having trans-fatty acid content reduced to the same extent as that in a general liquid salad oil, and the starting material thereof. The oxidized and partially hydrogenated oil or fat contains C18:2 trans-isomer from 10 to 60 wt. % on the total constituent fatty acid content basis and has peroxide value from 8 to 350 meq/kg. A ratio by weight of the C18:2 trans-isomer content to C18:1 trans-isomer content in all the constituent fatty acids can be 0.3 to 1.8.

13 Claims, No Drawings

OXIDIZED AND PARTIALLY HYDROGENATED OIL OR FAT

TECHNICAL FIELD

The present invention relates to an oxidized and partially hydrogenated oil or fat, more particularly an oil or fat composition having very low trans-fatty acid content while having hydrogenated aroma and hydrogenated flavor as conventional oil or fat compositions, and the above-mentioned oil or fat suitable as raw oil or fat for food products therewith.

BACKGROUND

A partially hydrogenated oil or fat produced by partially hydrogenating an edible vegetable oil or fat has better heat resistance and oxidation stability than liquid salad oil and has been conventionally used as cooking oil using heat for fried chicken, fried potato, doughnut and the like. The partially hydrogenated oil or fat has plasticity so that it can be also used to produce plastic oil or fat compositions such as margarine and shortening, and oiled food products such as foaming oil-in-water emulsion like whipped cream.

A partially hydrogenated oil or fat derived from edible vegetable oil or fat has unique aroma and flavor referred to as hydrogenated aroma or hydrogenated flavor. Such unique aroma and flavor is familiar to people through fried chicken, doughnut and the like.

The partially hydrogenated oil or fat derived from edible vegetable oil or fat contains up to some dozen % of trans-fatty acids which are produced during the hydrogenation reaction. It has been reported that, in animals including human beings, intake of a large amount of trans-fatty acids for a long period may cause elevated levels of total blood cholesterol and low-density lipoprotein cholesterol, leading to obesity, ischemic cardiac disease and the like. Therefore, increasing number of countries place mandatory labeling as trans-fatty acids for food products containing trans-fatty acids above a certain level. Recognizing this world-wide trend, also in Japan, there is a tendency to reduce trans-fatty acids in food products.

It is thought that hydrogenated aroma of the partially hydrogenated oil or fat is caused by degradation products of trans-fatty acids having a particular structure. Reducing content of trans-fatty acids leads to a problem of losing unique hydrogenated aroma and flavor.

In order to obtain an oil or fat composition having hydrogenated aroma and having reduced content of trans-fatty acids, Japanese Unexamined Patent Application Publication No. 2009-89684 proposes an oil or fat composition containing 1 to 30% of an oil or fat produced by mildly oxidizing partially a hydrogenated oil or fat until its peroxide value reaches 0.04 to 7. Japanese Unexamined Patent Application Publication No. 2010-99037 proposes an oil or fat composition containing a palm fractionated soft oil and a palm fractionated hard oil in a certain ratio. Japanese Unexamined Patent Application Publication No. 2011-115149 proposes a partially hydrogenated oil or fat characterized by containing 0.1 ppm or more of 3,7,11,15-tetramethyl-2-hexadecene and an oil or fat composition containing the same.

However, the above-mentioned technologies cannot provide satisfactory level of hydrogenated aroma, intensity of flavor and their persistence. There is a need for development of an oil or fat composition having a trans-fatty acid content reduced to a similar level to salad oil, while having hydrogenated aroma and flavor comparable to conventional ones, and furthermore having persistence of a similar level of hydrogenated aroma.

SUMMARY

An object of the present invention is to provide an oil or fat composition having hydrogenated aroma and flavor comparable to conventional ones and having persistence of hydrogenated aroma, while having a trans-fatty acid content reduced to a similar level to salad oil, and raw oil or fat therefor.

Another object of the present invention is to provide food products containing the above-mentioned oil or fat composition and food products having hydrogenated aroma and flavor produced by using the above-mentioned oil or fat composition.

In accordance with the present invention, an oxidized and partially hydrogenated oil or fat is provided in which C18:2 trans-isomer content on the basis of total constituent fatty acids content and peroxide value are controlled within certain ranges and has significantly rich hydrogenated aroma compared to conventional partially hydrogenated oil or fat. The use of a small amount of the oxidized and partially hydrogenated oil or fat may permit production of an oil or fat composition having hydrogenated aroma and flavor in a similar fashion to conventional ones while having a reduced trans-fatty acid content reduced.

The present invention provides an oxidized and partially hydrogenated oil or fat having 10 to 60 wt. % of C18:2 trans-isomer content on the basis of total constituent fatty acid content and having peroxide value from 8 to 350 meq/kg. The C18:2 trans-isomer refers to a collective term for fatty acids corresponding to all peaks appearing between a peak of C18:1 cis-isomer and a peak of C18:2 cis-isomer when the partially hydrogenated oil or fat is analyzed using gas chromatography. The C18:2 trans-isomer may be referred to as t18:2.

The ratio by weight of the C18:2 trans-isomer content to C18:1 trans-isomer content on the basis of total constituent fatty acids in the oxidized partially hydrogenated is preferably between 0.3 and 1.8. The C18:1 trans-isomer refers to collective term for fatty acids corresponding to all peaks appearing between a peak of C18:0 cis-isomer and a peak of C18:1 cis-isomer when the partially hydrogenated oil or fat using gas chromatography. Hereinafter, the C18:1 trans-isomer may be referred to as t18:1.

The above-mentioned oxidized and partially hydrogenated oil or fat is produced by, for example, partially hydrogenating an oil or fat and further oxidizing the resultant partially hydrogenated oil or fat.

The total content of linoleic acid and α-linolenic acid on the basis of total constituent fatty acid content of the above-mentioned partially hydrogenated oil or fat is preferably 10 wt. % or less.

The above-mentioned oil or fat is preferably edible vegetable oil or fat containing 10 wt. % or more of α-linolenic acid on the basis of total constituent fatty acid content.

The present invention also provides an oil or fat composition containing the above-mentioned oxidized and partially hydrogenated oil or fat.

The above-mentioned oil or fat composition preferably contains 0.01 to 10 wt. % of the above-mentioned oxidized and partially hydrogenated oil or fat.

The present invention also provides a food product containing the above-mentioned oil or fat composition.

The present invention also provides a food product cooked with the above-mentioned oil or fat composition.

The present invention also provides a method of producing an oxidized and partially hydrogenated oil or fat having C18:2 trans-isomer content from 10 to 60 wt. % on the basis of total constituent fatty acid content and having peroxide value from 8 to 350 meq/kg, comprising the step of partially hydrogenating an oil or fat until C18:2 trans-isomer content on the basis of total constituent fatty acid content reaches 10 to 60 wt. % and the step of oxidizing the oil or fat until peroxide value reaches 8 to 350 meq/kg.

The above-mentioned method preferably comprises the step of partially hydrogenating an oil or fat until C18:2 trans-isomer content on the basis of total constituent fatty acid content reaches 10 to 60 wt. % and the step of oxidizing the resultant partially hydrogenated oil or fat until peroxide value reaches 8 to 350 meq/kg.

In the above-mentioned method, it is preferable to heat the above-mentioned partially hydrogenated oil or fat at a temperature of 50 to 200° C.

The total content of linoleic acid and α-linolenic acid on the basis of total constituent fatty acid content of the above-mentioned partially hydrogenated oil or fat is preferably 10 wt. % or less.

The above-mentioned oil or fat is preferably edible vegetable oil or fat containing 10 to 70 wt. % of α-linolenic acid on the basis of total constituent fatty acid content.

Trans-fatty acid content in a conventional oil or fat composition containing partially hydrogenated oil or fat is typically about 10 to 50 wt. %. The oxidized and partially hydrogenated oil or fat of the present invention has rich hydrogenated aroma and flavor, and is superior in persistence of hydrogenated aroma. The oil or fat composition containing a small amount of such oxidized and partially hydrogenated oil or fat has hydrogenated aroma and hydrogenated flavor at the same level as conventional ones, although it has trans-fatty acid content lower than conventional ones. Food products prepared with the oil or fat composition of the present invention have rich hydrogenated aroma and hydrogenated flavor although they have very low trans-fatty acid content.

DETAILED DESCRIPTION

Hereinafter, an embodiment of the present invention will be described in detail. It is essential to control both of t18:2 content and peroxide value of the oxidized and partially hydrogenated oil or fat of the present invention within certain ranges. During the hydrogenation reaction, a double bond in an unsaturated fatty acid is isomerized from cis-form to trans-form, resulting in the formation of trans-fatty acid as a by-product. Furthermore a regioisomer in which the position of a double bond has been changed is also formed as a by-product. Typically, partially hydrogenated oil or fat contains cis-trans isomers or regioisomers of linoleic acid and oleic acid from several wt. % to several dozen wt. %. It is essential for the oxidized and partially hydrogenated oil or fat of the present invention to contain 10 wt. % or more of C18:2 trans-isomer on the total constituent fatty acid content basis. The C18:2 trans-isomer content is preferably 12 wt. % or more, more preferably 30 wt. % or more. An oxidized and partially hydrogenated oil or fat having C18:2 trans-isomer content less than 10 wt. % does not have rich hydrogenated aroma.

The C18:2 trans-isomer content on the basis of total constituent fatty acid content of the oxidized and partially hydrogenated oil or fat is 60 wt. % or less, preferably 50 wt. % or less, and more preferably 45 wt. % or less. It may be difficult to produce the oxidized and partially hydrogenated oil or fat containing more than 60 wt. % of C18:2 trans-isomer.

The ratio by weight of t18:2 content to t18:1 content on the basis of total constituent fatty acids is preferably in the range from 0.3 to 1.8. An oil or fat composition containing the oxidized and partially hydrogenated oil or fat with a ratio outside the range may give out unpleasant odor caused by deterioration during heating (hereinafter, referred to as "deterioration odor").

For the oxidized and partially hydrogenated oil or fat of the present invention, the lower limit of peroxide value is 8 meq/kg, preferably 10 meq/kg, more preferably 20 meq/kg and most preferably 30 meq/kg. If a certain amount of oxidized and partially hydrogenated oil or fat with peroxide value less than 8 meq/kg is added to a base oil and heated, hydrogenated aroma may be not strong and persistent sufficiently.

The upper limit of peroxide value is 350 meq/kg, preferably 300 meq/kg, more preferably 250 meq/kg and particularly preferably 220 meq/kg. When an oxidized and partially hydrogenated oil or fat having peroxide value higher than 350 meq/kg is added to base oil and heated, deterioration odor may occur.

Peroxide value of oil or fat may be determined according to the method described in "The JOCS Standard Methods for the Analysis of Fats, Oils and Related Materials", 2.5.2.1-1996, Japan Oil Chemists' Society.

The oxidized and partially hydrogenated oil or fat described above may be prepared by the producing method comprising the step of partially hydrogenating an oil or fat until C18:2 trans-isomer content on the basis of total constituent fatty acid content reaches 10 to 60 wt. % and the step of oxidizing the oil or fat until peroxide value reaches 8 to 350 meq/kg.

The step of partially hydrogenating oil or fat and the step of oxidizing the oil or fat are carried out in any order. Preferably, at first the oil or fat is partially hydrogenated until C18:2 trans-isomer content on the basis of total constituent fatty acid content reaches 10 to 60 wt. %, and then the resultant partially hydrogenated oil or fat is oxidized until peroxide value reaches 8 to 350 meq/kg. Thus, the above-mentioned oxidized and partially hydrogenated oil or fat is preferably prepared by partially hydrogenating an oil or fat, and oxidizing the resultant hydrogenated oil or fat. The partially hydrogenated oil or fat may be subjected to purification process such as decolorization treatment and deodorization treatment in accordance with an established method before the oxidation treatment.

Any oil or fat may be used as raw oil or fat for preparing the partially hydrogenated oil or fat used in the present invention as long as it can be used as edible oil or fat, although the oil or fat is preferably edible vegetable oil or fat. The examples of edible vegetable oil or fat include linseed oil, walnut oil, perilla oil (Japanese shiso oil), rapeseed oil, soybean oil, corn oil, palm oil and the like.

If the raw oil or fat contains preferably 10 wt. % or more, further preferably 40 wt. % or more, and more preferably 50 wt. % or more of α-linolenic acid on the basis of constituent fatty acid content, hydrogenated aroma and hydrogenated flavor of the resultant oxidized and partially hydrogenated oil or fat are enhanced. The oil or fat composition containing the oxidized and partially hydrogenated oil or fat of the present invention also has better hydrogenated aroma. Although there is no specifically defined upper limit of α-linolenic acid content on the basis of total constituent fatty acid content of the raw oil or fat, α-linolenic acid content in common edible oil or fat is typically no more than 70 wt. %.

The raw oil or fat preferably contains linseed oil, perilla oil (Japanese shiso oil) or walnut oil having high α-linolenic acid content. Particularly, it is desirable that the raw oil or fat contains one or two of linseed oil and perilla oil because they contain 50 wt. % or more of α-linolenic acid.

The raw oil or fat may be in combination of one or two or more of the above-mentioned type of oil or fat. Also the raw oil or fat may be one resulting from transesterification or fractionation of the above-mentioned oil or fat and also may be a mixture thereof.

The partially hydrogenated oil or fat may be produced using a routine method of hydrogenation reaction. For example, to edible vegetable oil or fat as raw oil or fat, is added 0.01 to 0.3 wt. %, on the raw oil basis, of nickel catalyst to conduct the hydrogenation reaction at 120 to 220° C. and under 0.01 to 0.3 MPa of hydrogen pressure.

In order to obtain the oil or fat composition with rich hydrogenated aroma, the hydrogenation reaction is preferably carried out using the above-mentioned raw oil or fat having high α-linolenic acid content, for example under selective conditions including: nickel catalyst (addition amount of the catalyst is 0.05 to 0.3 wt. % of), reaction temperature at 170 to 210° C., hydrogen pressure at 0.01 to 0.2 MPa. More preferably, the hydrogenation reaction is carried out using 0.1 to 0.3 wt. % of low-activity nickel catalyst (e.g. catalyst already used one or more times for hydrogenation reaction or product name 50650 (manufactured by Sakai Chemical Industry Co., LTD.) with reaction temperature at 190 to 210° C. and hydrogen pressure at 0.01 to 0.1 MPa.

The total content of linoleic acid and α-linolenic acid in the partially hydrogenated oil or fat after the hydrogenation is preferably 10 wt. % or less and more preferably 9 wt. % or less. There is no specifically defined lower limit of the total content and may be 0 as shown in Example 28 described below. Deterioration odor can be inhibited by controlling the total content to the given amount.

The oxidation treatment may be carried out by heating the oil or fat typically at 50 to 200° C., preferably 100 to 200° C. and more preferably 100 to 180° C. Although it is not necessary to send air to the reaction during heating, the oil or fat may be oxidized effectively in a short time until a certain peroxide value reaches a certain level by sending air at a given flow rate (e.g. 0.2 to 1.0 L/min) with stirring at a given rate (e.g. 50 to 350 rpm). The reduced duration of oxidation may prevent emission of deterioration odor. Peroxide value of the partially hydrogenated oil or fat (already purified) is usually zero before the oxidation treatment.

The present invention also provides an oil or fat composition containing the above-mentioned oxidized and partially hydrogenated oil or fat. An edible oil or fat to which the oxidized and partially hydrogenated oil or fat is added (hereinafter referred to as "base oil") may be any oil or fat as long as it belongs to edible oil or fat. The examples of base oil include vegetable oil or fat, such as palm oil, palm kernel oil, coconut oil, corn oil, cottonseed oil, soybean oil, rapeseed oil, rice oil, sunflower seed oil, safflower oil and cacao butter, and animal oil or fat such as lard. Also processed oil or fat such as fractionated oil thereof (palm mid fraction from palm oil, palm fractionated soft oil, palm fractionated hard oil, e.t.c) and transesterified oil, may be used as base oil. Such edible oil or fat may be used alone or in combination of two or more of such types of oil.

The oil or fat composition of the present invention may contain additives generally used for edible oil or fat. Examples of the additives include antioxidants such as tocopherol, vitamin C palmitate, lignan and oryzanol; emulsifiers such as lecitin, diglyceride, glycerin fatty acid ester, sorbitan fatty acid ester, propylene glycol fatty acid ester, sucrose fatty acid ester and polyglycerol fatty acid ester; antifoam agents such as silicone; flavor; physiological active substances such as coenzyme Q.

The content of the oxidized and partially hydrogenated oil or fat is typically 0.01 to 10 wt. %, preferably 0.1 to 10 wt. %, more preferably 0.1 to 5 wt. % on the basis of total weight of the composition. The oil or fat composition having the content within the above range has rich hydrogenated aroma and hydrogenated flavor and is superior in persistence of hydrogenated aroma, while having very low content of trans-fatty acids. In addition, the oil or fat composition has reduced deterioration odor.

Trans-fatty acid content of oil or fat can be measured by gas chromatography in according to USA Oil Chemists Society official method (Ce1h-05). The content of all-trans-fatty acid of the oxidized and hydrogenated oil according to the present invention is typically 40 to 68 wt. % and particularly 45 to 65 wt. %. The content of all-trans-fatty acid of the oil or fat composition to which the hydrogenation oil or fat is added within the above-mentioned range is typically 0.004 to 6.5 wt. % and particularly 0.05 to 3.3 wt. %. These values are about 1/1,000 to ⅓ of the value for a conventional oil or fat composition (containing between 10 to 50 wt. % of trans-fatty acids) having a similar level of hydrogenated aroma to the present invention.

The oil or fat composition of the present invention may be suitably used to prepare oiled food products, such as oil-in-water emulsions, foaming oil-in-water emulsions, water-in-oil emulsions, plasticity oil or fat compositions, roux and chocolate; and food products cooked using heat such as deep-fried foods and pan-fried foods.

The present invention provides food products containing the oil or fat composition of the present invention. Such food products include oiled food products produced with the oil or fat composition of the present invention, such as oil-in-water emulsion, foaming oil-in-water emulsions, water-in-oil emulsions, plastic oil or fat compositions, roux and chocolate; and processed food products produced with these oiled food products.

Among the food products of the present invention, the specific examples of oiled food products include, for example, oil-in-water emulsions such as cream; foaming oil-in-water emulsions such as whipped cream; plastic oil or fat compositions such as margarine/shortening (for kneading into or rolling in dough for confectionery or breadmaking, for deep-frying, for pan-frying, for making butter cream and the like); roux such as curry roux; chocolate and the like.

The oiled food products can be produced with a routine method without the need of materials to be used and special conditions, as long as the products are produced with the oil or fat composition of the present invention. For the oiled food products, the oil or fat composition of the present invention constitutes preferably 30 to 100 wt. %, more preferably 50 to 100 wt. % and most preferably 70 to 100 wt. % of oil or fat to be used for producing oiled food products.

Specific examples of the processed food products include baked goods, such as cake, cookies, biscuits and pie; bread such as sliced bread, pastry and Danish pastry; pizza; roux such as curry roux and the like.

The processed food products can be produced with a routine method without the need of materials to be used and special conditions, as long as the oiled food product produced with the oil or fat composition of the present invention is used.

The present invention also provides food products prepared using the oil or fat composition of the present invention.

The prepared food products include cooked food products obtained by cooking, such as deep-fried foods, pan-fried foods and the like.

Specific examples of the cooked food products include su-age, kara-age, cutlets, croquettes, fried foods (such as fried chicken and fried potato), tempura, doughnut, fried noodle, rice crackers, cubic rice crackers, biscuits, crackers, cookies, pretzels, corn chips, corn puffs, popcorn, potato chips, nuts, buttered peanuts, snacks and the like.

The cooked food products can be produced (cooked) using a routine method without the need of materials to be used and special conditions, except the oil or fat composition of the present invention is used for cooking.

EXAMPLES

Hereinafter, the present invention will be described in more detail based on Examples. However, the present invention is not limited to the following examples.

Examples 1-16

Preparation and Evaluation of Oxidized and Partially Hydrogenated Oil or Fat

Two oxidized and partially hydrogenated oil or fat having t18:2 content of 37.0 wt. % and 28.8 wt. % respectively were changed in peroxide value, and their effect on hydrogenated aroma was examined.

1. Preparation of Oxidized and Partially Hydrogenated Oil or Fat 700 g of linseed oil containing 55.3 wt. % of α-linolenic acid on the basis of constituent fatty acid content (manufactured by J-OIL MILLS, INC.) was partially hydrogenated for 220 minutes under the condition shown in Table 1. This partial hydrogenation treatment was repeated several times until a required amount of the partially hydrogenated oil or fat yielded. Also, 700 g of oil or fat blending the above-mentioned linseed oil with soybean oil containing 7.2 wt. % of α-linolenic acid on the basis of constituent fatty acid content (product name: Daizu Sirasameyu (Soybean refined oil), J-OIL MILLS, INC.) at the ratio by weight of 3:7 was partially hydrogenated for 100 minutes under the condition shown in Table 1. This partial hydrogenation treatment was repeated several times until a required amount of the partially hydrogenated oil or fat yielded. Total amount of linoleic acid+α linolenic acid in the resultant partially hydrogenated oil or fat is shown in Table 2.

250 g of the above-mentioned partially hydrogenated oil or fat was placed in a 500 mL stainless-steel beaker, which was then soaked in oil bath at 105° C. The resultant oil or fat was forcibly oxidized with stirring at 250 rpm and sending air into the oil or fat at 0.8 L/minute until the peroxide value reached the value shown in Table 2.

TABLE 1

| Catalyst | Product name SO650 (content of Nickel: 14 wt. %, manufactured by Sakai Chemical Industry Co., LTD.) |
|---|---|
| Addition amount of the catalyst | 0.13% |
| Reaction temperature | 200° C. |
| Hydrogen pressure | 0.05 MPa |
| Stirring rate | 700 rpm |

The fatty acid composition analysis was conducted for each resultant oxidized and partially hydrogenated oil or fat using the following procedure. After the oxidized and partially hydrogenated oil or fat was converted to fatty acid methyl ester by Boron Trifluoride-Methanol method, the fatty acid composition was analyzed using gas chromatography (GC) process. GC measurement condition is shown below.

| | |
|---|---|
| GC device | Product name GC2010 (manufactured by Shimadzu Corporation) |
| Column | SP-2560 (100 m × 0.25 mm × 0.2 μm) (manufactured by Supelco) |
| Inlet temperature | 250° C. |
| Carrier gas | helium (29.1 ml/min) |
| Split ratio | 25:1 |
| Column temperature | 180° C. for 55 min → (8° C./min) → 220° C. for 5 min. |
| Detector | hydrogen flame ionization detector (260° C.) |

The resultant GC chromatogram was compared with FIG. 5 in Journal of Oleo Science, Vol. 50, No. 5 (2001), 339-352, in which peaks in the GC chromatogram were identified as below:

All-trans-fatty acids: fatty acids corresponding to peak numbers 1 to 7, 13 to 27 and 30 to 33 in the FIG. 5.

C18:1 trans-isomers (t18:1): fatty acids corresponding to peak numbers 1 to 7 in the FIG. 5.

C18:2 trans-isomers (t18:2): fatty acids corresponding to peak numbers 13 to 27 in the FIG. 5.

2. Preparation and Evaluation of the Oil or Fat Composition

To palm fractionated soft oil having Iodine value 67 (manufactured by J-OIL MILLS, Inc.) was added the resultant oxidized and partially hydrogenated oil or fat at 1 wt. %, to yield the oil or fat composition.

600 g of the above-mentioned oil or fat composition was placed in a pot and heated at 180° C. for 30 minutes. Three specialized panelists evaluated properties of the oil or fat compositions on heating according to the following criterion.

Hydrogenated Aroma:
  6: acute aroma
  5: strong aroma
  4: a little strong aroma
  3: clear aroma
  2: mild aroma
  1: slight aroma
  0: no aroma Deterioration Odor:
  6: no odor
  5: slight odor
  4: mild odor
  3: clear odor
  2: a little strong odor
  1: strong odor
  0: acute odor The result is shown in Table 2.

600 g of the above-mentioned oil or fat composition was placed on a porcelain dish and heated at 180° C. and then three specialized panelists determined the persistence of hydrogenated aroma on heating. Evaluation criterion is as follows.

The persistence of hydrogenated aroma:
  ⊚: lasting for more than 8 hours.
  ○: lasting for over 5 hours but less than 8 hours.
  Δ: lasting for over two hours but less than 5 hours.
  ×: lasting for less than two hours.

The result is shown in Table 2.

TABLE 2

| | Type of raw oil | Partially hydrogenated oil or fat | | Oxidized and partially hydrogenated oil or fat | | | |
|---|---|---|---|---|---|---|---|
| | Composition | Content of α-linolenic acid (wt. %) | Hydrogenation reaction time (min) | Content of linoleic acid + α-linolenic acid (wt. %) | Content of all trans fatty acids (wt. %) | Content of t18:2 (wt. %) | t18:2/ t18:1 | Peroxide value (meq/kg) |
| Control | Soy bean oil | 7.2 | — | 3.6 | 57.3 | 10.0 | 0.2 | 0 |
| Comparative example 1 | Linseed oil | 55.3 | 220 | 3.8 | 59.8 | 37.0 | 1.6 | 0 |
| Comparative example 2 | | | | | 60.0 | 37.0 | 1.6 | 6 |
| Example 1 | | | | | 60.3 | 37.1 | 1.6 | 10 |
| Example 2 | | | | | 60.8 | 37.1 | 1.6 | 15 |
| Example 3 | | | | | 61.5 | 37.1 | 1.5 | 22 |
| Example 4 | | | | | 61.8 | 37.2 | 1.5 | 30 |
| Example 5 | | | | | 63.2 | 37.4 | 1.4 | 100 |
| Example 6 | | | | | 65.5 | 37.5 | 1.3 | 170 |
| Example 7 | | | | | 65.5 | 37.5 | 1.3 | 200 |
| Example 8 | | | | | 66.1 | 37.9 | 1.3 | 250 |
| Example 9 | | | | | 67.0 | 38.0 | 1.3 | 350 |
| Example 10 | Linseed oil 30% Soybean oil 70% | 22.0 | 100 | 6.1 | 56.3 | 28.8 | 1.1 | 10 |
| Example 11 | | | | | 55.8 | 28.7 | 1.1 | 30 |
| Example 12 | | | | | 55.3 | 28.3 | 1.0 | 100 |
| Example 13 | | | | | 54.5 | 27.9 | 1.1 | 173 |
| Example 14 | | | | | 55.6 | 27.9 | 1.0 | 200 |
| Example 15 | | | | | 55.2 | 27.2 | 1.0 | 250 |
| Example 16 | | | | | 55.2 | 27.0 | 1.0 | 350 |

| | Oil or fat composition | | | | | |
|---|---|---|---|---|---|---|
| | A✕ (wt. %) | B✕ (wt. %) | C✕ (wt. %) | Hydrogenated aroma | Deterioration odor | Persistence of hydrogenated aroma |
| Control | 50 | 50 | 28.7 | 6 | 6 | ◎ |
| Comparative example 1 | 99 | 1 | 0.6 | 2 | 6 | X |
| Comparative example 2 | | | 0.6 | 2 | 6 | X |
| Example 1 | | | 0.6 | 2 | 6 | Δ |
| Example 2 | | | 0.6 | 4 | 6 | Δ |
| Example 3 | | | 0.6 | 5 | 6 | ○ |
| Example 4 | | | 0.6 | 5 | 6 | ◎ |
| Example 5 | | | 0.6 | 6 | 6 | ◎ |
| Example 6 | | | 0.7 | 6 | 6 | ◎ |
| Example 7 | | | 0.7 | 6 | 6 | ◎ |
| Example 8 | | | 0.7 | 6 | 5 | ◎ |
| Example 9 | | | 0.7 | 6 | 1 | ◎ |
| Example 10 | 99 | 1 | 0.6 | 2 | 6 | Δ |
| Example 11 | | | 0.6 | 3 | 6 | ○ |
| Example 12 | | | 0.6 | 5 | 6 | ◎ |
| Example 13 | | | 0.5 | 5 | 6 | ◎ |
| Example 14 | | | 0.6 | 5 | 6 | ◎ |
| Example 15 | | | 0.6 | 6 | 5 | ◎ |
| Example 16 | | | 0.6 | 5 | 1 | ◎ |

✕A: Content of base oil (palm fractionated oil (IV67, manufactured by J-OIL MILLS, INC.))
✕B: Content of oxidized and partially hydrogenated oil or fat
✕C: Content of all-trans-fatty acids Table 2 indicates that when the oxidized and partially hydrogenated oil or fat having 27.0 to 38.0 wt. % of t18:2 content has peroxide value within a certain range, the oil or fat composition to which as little as 1 wt. % of such oxidized and partially hydrogenated oil or fat has been added (containing 0.5 to 0.7 wt. % of all-trans-fatty acids) may have comparable hydrogenated aroma to the control composition (containing 28.7 wt. % of all-trans-fatty acids). Therefore, according to the oil or fat composition of the present invention, it is possible to allow the oil or fat composition to have hydrogenated aroma as is the case for a conventional oil or fat composition, while reducing the content of all-trans-fatty acid to 1/40 or less of the content in a conventional oil or fat composition.

If using the oxidized and partially hydrogenated oil or fat with peroxide value 6 meq/kg or less, the resultant oil or fat composition, while deterioration odor is weak, has weak hydrogenated aroma which is not lasting sufficiently. When peroxide value is increased to 350 meq/kg, while hydrogenated aroma is strong, deterioration odor is also given off.

The oil or fat composition having peroxide value preferably from 15 to 250 meq/kg and more preferably from 30 to 250 meq/kg is the best one overall in that hydrogenated aroma on heating is rich and long lasting sufficiently, and deterioration odor is weak.

Examples 17-24

The Content of C18:2 Trans-Isomer

The oxidized and partially hydrogenated oil or fat having peroxide value in 170 meq/kg was examined for effect of t18:2 content on hydrogenated aroma in the following procedure.

1. Preparation of the Oxidized and Partially Hydrogenated Oil or Fat

The oxidized and partially hydrogenated oil or fat was produced with the same procedure as described in Example 1 except 700 g of the above-mentioned linseed oil or perilla oil (containing 65.4 wt. % of α-linolenic acid on the total constituent fatty acid content basis, manufactured by OHTA OIL MILL CO., LTD.) was hydrogenated under the same condition as shown in Table 1 for various reaction duration shown in Table 3, and then oxidized until peroxide value reached 170 meq/kg. Fatty acid composition of each resultant oil or fat is shown in Table 3.

2. Preparation and Evaluation of the Oil or Fat Composition

The resultant oxidized and partially hydrogenated oil or fat was added to palm fractionated soft oil (iodine value 67, manufactured by J-OIL MILLS, Inc.) at 1 wt. % to obtain the oil or fat composition. The yielded oil or fat composition was evaluated with the same procedure as shown in Example 1. The evaluation result is shown in Table 3.

Table 3 indicates that the oil or fat composition prepared with the oxidized and partially hydrogenated oil or fat having less than 10 wt. % of t18:2 content in comparative example 3 has weak hydrogenated aroma which poorly lasts. In contrast, the oil or fat compositions in Examples 6 and 17 to 24, which have 10 wt. % or more of t18:2 content, have sufficiently rich hydrogenated aroma, furthermore which lasts longer. To summarize these results and Examples 1 to 16, in order to produce rich hydrogenated aroma and its better persistence, it is necessary for the oxidized and partially hydrogenated oil or fat to combine high peroxide value from 8 to 350 meq/kg and t18:2 content at least 10 wt. %, preferably at least 12 wt. % and more preferably at least 30 wt. %.

The oil or fat composition in comparative example 3 has very strong deterioration odor. Then the oil or fat composition in Example 23 has mild deterioration odor. It is likely that cause of such odor is related to high total content of linoleic acid and α-linolenic acid in the partially hydrogenated oil or fat and the ratio by weight of t 18:2 to t 18:1 content on the basis of total constituent fatty acids. Then in order to avoid deterioration odor produced, in the oil or fat composition of the present invention prepared using the oxidized and partially hydrogenated oil or fat with high t18:2 content, the total content of linoleic acid and α-linolenic acid of the partially hydrogenated oil or fat is preferably controlled to 10 wt. % or less and more preferably 9 wt. % or less. Furthermore the ratio by weight of t18:2 to t18:1 content on the basis of total constituent fatty acids content of the oxidized and partially hydrogenated oil or fat is preferably controlled to 0.3 to 1.8.

TABLE 3

| | Type of raw oil | | Partially hydrogenated oil or fat | | Oxidized and partially hydrogenated oil or fat | | | |
|---|---|---|---|---|---|---|---|---|
| | Composition | Content of α-linolenic acid (wt. %) | Hydrogenation reaction time (min) | Content of linoleic acid + α-linolenic acid (wt. %) | Content of all trans fatty acids (wt. %) | Content of t18:2 (wt. %) | t18:2/ t18:1 | Peroxide value (meq/kg) |
| Comparative example 3 | Linseed oil | 55.3 | 60 | 12.0 | 49.0 | 8.5 | 0.2 | 170 |
| Example 17 | | | 80 | 7.0 | 53.5 | 12.7 | 0.3 | |
| Example 18 | | | 110 | 7.0 | 62.0 | 20.8 | 0.5 | |
| Example 19 | | | 120 | 9.0 | 53.0 | 21.7 | 0.7 | |
| Example 20 | | | 140 | 9.0 | 50.0 | 24.8 | 1.0 | |
| Example 21 | | | 170 | 7.0 | 56.0 | 30.5 | 1.2 | |
| Example 22 | | | 200 | 7.0 | 57.7 | 35.6 | 1.6 | |
| Example 6 | | | 220 | 3.8 | 65.5 | 37.5 | 1.3 | |
| Example 23 | | | 160 | 11.0 | 50.0 | 32.5 | 1.9 | |
| Example 24 | Perilla oil | 65.4 | 240 | 3.0 | 66.0 | 42.3 | 1.8 | |

| | Oil or fat composition | | | | | |
|---|---|---|---|---|---|---|
| | A✕ (wt. %) | B✕ (wt. %) | C✕ (wt. %) | Hydrogenated aroma | Deterioration odor | Persistence of hydrogenated aroma |
| Comparative example 3 | 99 | 1 | 0.5 | 2 | 1 | X |
| Example 17 | | | 0.5 | 3 | 6 | Δ |
| Example 18 | | | 0.6 | 3 | 6 | ◯ |
| Example 19 | | | 0.5 | 4 | 6 | ◯ |
| Example 20 | | | 0.5 | 5 | 6 | ◯ |
| Example 21 | | | 0.6 | 6 | 6 | ◎ |
| Example 22 | | | 0.6 | 6 | 6 | ◎ |
| Example 6 | | | 0.7 | 6 | 6 | ◎ |
| Example 23 | | | 0.5 | 6 | 4 | ◎ |
| Example 24 | | | 0.7 | 6 | 6 | ◎ |

✕A: Content of base oil (palm fractionated oil (IV67, manufactured by J-OIL MILLS, INC.))
✕B: Content of oxidized and partially hydrogenated oil or fat
✕C: Content of all-trans-fatty acids

Examples 25-31

α-Linolenic Acid Content in Raw Oil or Fat

The oxidized and partially hydrogenated oil or fat and the oil or fat compositions containing the same according to the present invention were prepared using raw oils and fats having a different α-linolenic acid content, and their physical properties on heating were evaluated.

1. Preparation of the Oxidized and Partially Hydrogenated Oil or Fat

The oxidized and partially hydrogenated oils and fats were prepared using the same procedure as Examples except the raw oil or fat to be used, hydrogenation reaction condition and oxidative treatment were modified as shown in Table 4. Origins of the raw oil or fat used are as follows.

Perilla oil: manufactured by OHTA OIL MILL CO., LTD.
Linseed oil: manufactured by J-OIL MILLS, INC.
High oleic safflower oil: product name J Ichiban-shibori safflower oil manufactured by J-OIL MILLS, INC.
Soybean oil: product name Soybean refined oil, manufactured by J-OIL MILLS, INC.
Corn oil: product name J Corn oil, manufactured by J-OIL MILLS, INC.
Palm fractionated soft oil: Iodine value 67, manufactured by J-OIL MILLS, INC.
Rapeseed oil: product name J Canola oil, manufactured by J-OIL MILLS, INC.

Property of each oxidized and partially hydrogenated oil or fat is shown in Table 4.

2. Preparation and Evaluation of the Oil or Fat Compositions

The resultant oxidized and partially hydrogenated oil or fat was added to palm fractionated soft oil (iodine value 67, J-OIL MILLS, INC.) at 1 wt. % to obtain an oil or fat composition. The above-mentioned oil or fat composition was evaluated with the same procedure as described in Example 1. The result of the evaluation is shown in Table 4.

TABLE 4

| | Type of raw oil | | Partially hydrogenated oil or fat | | Oxidized and partially hydrogenated oil or fat | | | |
|---|---|---|---|---|---|---|---|---|
| | Composition | Content of α-linolenic acid (wt %) | Hydrogenation reaction time (min) | Content of linoleic acid + α-linolenic acid (wt %) | Content of all trans fatty acids (wt %) | Content of t18:2 (wt %) | t18:2/ t18:1 | Peroxide value (meq/kg) |
| Example 24 | Perilla oil | 65.4 | 240 | 3.0 | 66.0 | 42.3 | 1.8 | 170 |
| Example 6 | Linseed oil | 55.3 | 220 | 3.8 | 65.5 | 37.5 | 1.3 | 170 |
| Example 25 | Linseed oil 85% Soybean oil 15% | 48.1 | 180 | 5.0 | 57.3 | 35.2 | 1.6 | 170 |
| Example 26 | Linseed oil 70% Soybean oil 30% | 40.9 | 150 | 7.0 | 56.4 | 31.9 | 1.3 | 170 |
| Example 27 | Linseed oil 50% Soybean oil 50% | 31.3 | 120 | 8.7 | 55.4 | 30.6 | 1.2 | 170 |
| Example 13 | Linseed oil 30% Soybean oil 70% | 22.0 | 100 | 6.1 | 54.5 | 27.9 | 1.1 | 173 |
| Example 28 | Linseed oil 15% Soybean oil 85% | 12.1 | 120 | 0.0 | 57.1 | 23.3 | 0.7 | 171 |
| Comparative example 4 | Soybean oil | 7.2 | 60 | 19.1 | 21.5 | 4.2 | 0.2 | 151 |
| Example 29 | Linseed oil 50% Corn oil 50% | 27.8 | 100 | 8.0 | 47.3 | 21.7 | 0.8 | 170 |
| Example 30 | Linseed oil 50% Palm fractionated soft oil 50% | 27.7 | 100 | 8.0 | 41.2 | 22.8 | 1.2 | 170 |
| Example 31 | Linseed oil 50% Rapeseed oil 50% | 32.2 | 120 | 8.0 | 48.1 | 28.3 | 1.4 | 170 |
| Comparative example 5 | Rapeseed oil | 9.0 | 70 | 5.0 | 27.5 | 2.2 | 0.1 | 150 |
| Comparative example 6 | High oleic safflower oil | 0.0 | 120 | 4.0 | 47.5 | 7.0 | 0.2 | 165 |

TABLE 4-continued

|  | Oil or fat composition | | | | | |
| --- | --- | --- | --- | --- | --- | --- |
|  | A✕ (wt %) | B✕ (wt %) | C✕ (wt %) | Hydrogenated aroma | Deterioration odor | Persistence of hydrogenated aroma |
| Example 24 | 99 | 1 | 0.7 | 6 | 6 | ◎ |
| Example 6 | 99 | 1 | 0.7 | 6 | 6 | ◎ |
| Example 25 | 99 | 1 | 0.6 | 6 | 6 | ◎ |
| Example 26 | 99 | 1 | 0.6 | 6 | 6 | ◎ |
| Example 27 | 99 | 1 | 0.6 | 5 | 6 | ◎ |
| Example 13 | 99 | 1 | 0.5 | 5 | 6 | ◎ |
| Example 28 | 99 | 1 | 0.6 | 5 | 6 | ◎ |
| Comparative example 4 | 99 | 1 | 0.2 | 4 | 6 | X |
| Example 29 | 99 | 1 | 0.5 | 5 | 6 | ◎ |
| Example 30 | 99 | 1 | 0.4 | 5 | 6 | ◎ |
| Example 31 | 99 | 1 | 0.5 | 5 | 6 | ◎ |
| Comparative example 5 | 99 | 1 | 0.3 | 0 | 5 | X |
| Comparative example 6 | 99 | 1 | 0.5 | 2 | 5 | X |

✕A: Content of base oil (palm fractionated oil (IV67, manufactured by J-OIL MILLS, INC.))
✕B: Content of oxidized and partially hydrogenated oil or fat
✕C: Content of all-trans-fatty acids Table 4 indicates that in Comparative examples 4 to 6 using raw oils and fats having less than 10 wt. % of α-linolenic acid content, only oxidized and partially hydrogenated oils and fats having t18:2 content less than the range defined in the present invention were obtained. As a result, the obtained oil or fat composition has weak hydrogenated aroma and the aroma is not long lasting. On the other hand, Examples using a raw oil or fat having more than 10 wt. % of α-linolenic acid content provide the oxidized and partially hydrogenated oil or fat having t18:2 content within the range defined in the present invention. As a result, the resultant oil or fat compositions have rich and long lasting hydrogenated aroma.

Any types of raw oil or fat may be used in the present invention as long as α-linolenic acid content is more than 10 wt. % as shown in Examples 25 to 31. In Examples 6 and 24 to 26 in which linseed oil having high α-linolenic acid content was formulated much, the raw oil or fat contained 40 wt. % or more of α-linolenic acid. As a result, the oil or fat composition which was superior in hydrogenated aroma and its persistence was obtained.

3. Tests for Deep-Fried Food Products

Deep-fried food products were cooked using the oil or fat composition of Example 6 or 28 and evaluated their hydrogenated flavor and its persistence. For comparison, the same tests were performed for the oil or fat compositions in Comparative examples 4 and 6. The procedure of the evaluation tests is shown below.

2.8 kg of each oil or fat composition was placed in a 3 L fryer and heated at 180° C. for 10 hours. Meanwhile, 300 g of frozen fried potato (manufactured by AJINOMOTO FROZEN FOODS Co., Inc.) per fryer was fried in the fryer for 3 minutes and 30 seconds every one hour and, in addition, 4 pieces of commercially available chicken thigh cut for kara-age with coating of commercially available kara-age batter mix (manufactured by Nisshin Flower Milling Inc.) were fried for 4 minutes.

Three specialized panelists evaluated hydrogenated flavor of the deep-fried food products and its persistence according to the following criterion.

<Hydrogenated Flavor of Deep-Fried Food Products>
6: acute flavor
5: strong flavor
4: a little strong flavor
3: clear flavor
2: mild flavor
1: slight flavor 0: no flavor <Persistence of Hydrogenated Flavor in Deep-Fried Food Products>
◎: lasting for more than 8 hours.
o: lasting for over 5 hours but less than 8 hours.
Δ: lasting for over two hours but less than 5 hours.
x: lasting for less than two hours.
The Result is shown in Table 5.

TABLE 5

|  | Deep-fried food products | |
| --- | --- | --- |
|  | Hydrogenated flavor | Persistence of hydrogenated flavor |
| Comparative example 4 | 3 | X |
| Comparative example 6 | 0 | X |
| Example 6 | 5 | ◎ |
| Example 28 | 5 | ◎ |

Table 5 indicates that the deep-fried food products cooked with the oil or fat composition containing the partially hydrogenated oil or fat in Comparative example 4 or 6 had weak hydrogenated flavor or, if that flavor was strong at all, it was not persistent. On the other hand, the deep-fried food products cooked with the oil or fat composition containing the oxidized and partially hydrogenated oil or fat in Example 6 or 28, had rich and long lasting hydrogenated flavor. These results were consistent with the evaluation result of oil or fat compositions shown in Table 4.

4. A Test for Processed Food Products

The oxidized and partially hydrogenated oil or fat prepared in Example 6 was used to make bread and soup to evaluate their hydrogenated flavor. For comparison, the same test was performed using the partially hydrogenated oil or fat prepared in Comparative example 6.

(1) Making Bread

At first, materials of composition listed in Table 6 were placed in a commercially available automatic home bread-baking machine to prepare dough.

TABLE 6

| Material | Blending amount |
|---|---|
| Hard wheat flour | 160 g |
| Soft wheat flour | 40 g |
| Margarine | 22 g |
| Oil or fat composition | 10 g (prepared by adding the oxidized and partially hydrogenated oil or fat of Example 6 or Comparative example 6, the adding amount of which was 10 wt. % on the basis of total weight of the composition, to palm fractionated soft oil) |
| Sugar | 16 g |
| Salt | 3.2 g |
| Milk | 130 mL |
| Dry yeast | 2.4 g |

The resultant dough was divided into 8 equal pieces and punched down, followed by forming each of the pieces into a ball and then letting them stand for 15 minutes. Each piece of dough was rolled out using a rolling pin and rolled up from one end for shaping before rising at 35° C. for 30 minutes. An appropriate amount of beaten egg was applied to the surface of those shaped pieces of dough, which were then placed in an oven at 180° C. for 12 minutes to bake bread rolls.

(2) Making Soup

To commercially available powdered soup (product name: Onion Consomme, Knorr Foods Co., Ltd.) was added the oil or fat composition prepared in (1) at 1 wt. % on weight of the powdered soup basis, to which then hot water was added.

Hydrogenated flavor of the prepared bread rolls and soup was evaluated by three specialized panelists. The evaluation criterion is as follows.

<Hydrogenated Flavor of Bread and Powdered Soup>
 6: acute flavor
 5: strong flavor
 4: a little strong flavor
 3: clear flavor
 2: mild flavor
 1: slight flavor
 0: no flavor The Result is shown in Table 7.

TABLE 7

|  | Hydrogenated flavor of food products | |
|---|---|---|
|  | Bread | Soup |
| Comparative example 6 | 0 | 0 |
| Example 6 | 5 | 6 |

Table 7 indicates that both of bread and soup cooked with the oil or fat composition in comparable example 6 had no hydrogenated flavor. On the other hand, bread and soup cooked with the oil or fat composition in Example 6 had rich hydrogenated flavor.

Examples 32-45

Addition Amount of the Oxidized and Partially Hydrogenated Oil or Fat

The oil or fat compositions were prepared by adding the oxidized and partially hydrogenated oil or fat prepared in Example 6 to each of various types of base oil listed in Table 8 in various proportions. The resultant oil or fat compositions were evaluated with the similar procedure as described in Example 1. The Result is shown in Table 8.

TABLE 8

| | Base oil | | Content of oxidized and partially hydrogenated oil or fat<sup>X</sup> (wt. %) | Content of all trans fatty acids (wt. %) | Property on heating | | |
|---|---|---|---|---|---|---|---|
| | Type | Content (wt. %) | | | Hydrogenated aroma | Deterioration odor | Persistence of hydrogenated aroma |
| Example 32 | Palm fractionated soft oil | 99.99 | 0.01 | 0.007 | 3 | 6 | Δ |
| Example 33 | | 99.95 | 0.05 | 0.03 | 4 | 6 | ○ |
| Example 34 | | 99.9 | 0.1 | 0.07 | 5 | 6 | ○ |
| Example 35 | | 99.5 | 0.5 | 0.3 | 5 | 6 | ⊚ |
| Example 6 | | 99 | 1 | 0.7 | 6 | 6 | ⊚ |
| Example 36 | | 98 | 2 | 1.3 | 6 | 6 | ⊚ |
| Example 37 | | 95 | 5 | 3 | 6 | 5 | ⊚ |
| Example 38 | | 90 | 10 | 7 | 5 | 4 | ⊚ |
| Example 39 | | 85 | 15 | 10 | 4 | 0 | ⊚ |
| Example 40 | Palm fractionated soft oil 50% | 99 | 1 | 0.7 | 6 | 6 | ⊚ |
| Example 41 | Soybean oil | | | 0.7 | 6 | 6 | ⊚ |
| Example 42 | Palm fractionated soft oil 50% Rapeseed oil 50% | | | 0.7 | 6 | 6 | ⊚ |
| Example 43 | Rapeseed oil | | | 0.7 | 6 | 6 | ⊚ |
| Example 44 | Palm fractionated soft oil 50% Corn oil 50% | | | 0.7 | 6 | 6 | ⊚ |
| Example 45 | Corn oil | | | 0.7 | 6 | 6 | ⊚ |

<sup>X</sup>Oxidized and partially hydrogenated oil or fat prepared in Example 6.

Table 8 indicates that hydrogenated aroma is given out when the oil or fat composition contains 0.01 wt. % or more of the oxidized and partially hydrogenated oil, and at 0.5 to 10 wt. %, the aroma is strongest. If containing 15 wt. % or more, the oil or fat composition gives out strong deterioration odor and, in turn, its hydrogenated aroma becomes weak. In order to obtain an oil or fat composition totally excellent in rich hydrogenated aroma and weak deterioration odor, the range is preferably between 0.1 to 10 wt. % and more preferably 0.1 to 5 wt. %.

Example 46

The Method of Oxidation

The oxidized and partially hydrogenated oil or fat of the present invention and the oil or fat composition containing the same were prepared by changing method of oxidation, and physical properties on heating was evaluated.

1. Preparation of the Oxidized and Partially Hydrogenated Oil or Fat

The oxidized and partially hydrogenated oil or fat having peroxide value 10 meq/kg was prepared using the same procedure as described in Example 1 except the oxidation was done by heating at 180° C. for 10 hours without sending air.

2. Preparation and Evaluation of the Oil or Fat Composition

The oil or fat composition was prepared by adding the resultant oxidized and partially hydrogenated oil or fat to palm fractionated soft oil (iodine value 67, manufactured by J-OIL MILLS, INC.) at 1 wt. %. The resultant oil or fat composition was evaluated using the similar procedure to Example 1. The result is shown in Table 9.

TABLE 9

| | Method of oxidization of hydrogenated oil or fat | Peroxide value of oxidized and partially hydrogenated oil or fat | Oil or fat composition | | | | | |
|---|---|---|---|---|---|---|---|---|
| | | | A* (wt. %) | B* (wt. %) | C* (wt. %) | Hydrogenated aroma | Deterioration odor | Persistence of hydrogenated aroma |
| Example 46 | Heat at 180° C. | 10 | 99 | 1 | 0.6 | 4 | 4 | ∆ |
| Example 1 | Sending air | 10 | 99 | 1 | 0.6 | 2 | 6 | ∆ |
| Example 6 | at 105° C. | 170 | 99 | 1 | 0.7 | 6 | 6 | ◉ |

*A: Content of base oil (palm fractionated oil (IV67, manufactured by J-OIL MILLS, INC.))
*B: Content of oxidized and partially hydrogenated oil or fat
*C: Content of all-trans-fatty acids As shown in Table 9, the oil or fat composition of Example 46 exhibited excellent hydrogenated aroma and its persistence compared to the composition of Example 1 having the same peroxide value, but was inferior in deterioration odor to Example 1. The oil or fat composition of Example 6, prepared by oxidizing until peroxide value reached 170 meq/kg while sending air at 105° C. had rich hydrogenated aroma and weak deterioration odor. To summarize the above-mentioned results, although the oil or fat composition with hydrogenated aroma may be produced by oxidation with heating at 180° C., it may be preferable to carry out oxidation with sending air to increase peroxide value rapidly in order to produce the totally excellent oil or fat composition in regard to hydrogenated aroma and deterioration odor.

What is claimed:

1. An oxidized and partially hydrogenated oil or fat, having 10 to 60 wt. % of C18:2 trans-isomer content on the basis of total constituent fatty acid content and having peroxide value from 20 to 350 meq/kg.

2. The oxidized and partially hydrogenated oil or fat according to claim 1, wherein the ratio by weight of the C18:2 trans-isomer content to C18:1 trans-isomer content on the basis of total constituent fatty acids content is between 0.3 and 1.8.

3. The oxidized and partially hydrogenated oil or fat according to claim 1, wherein the oxidized and partially hydrogenated oil or fat is produced by partially hydrogenating an oil or fat and then oxidizing the resultant partially hydrogenated oil or fat.

4. The oxidized and partially hydrogenated oil or fat according to claim 3, wherein the total content of linoleic acid and α-linolenic acid on the basis of total constituent fatty acid content of the partially hydrogenated oil or fat is 10 wt. % or less.

5. The oxidized and partially hydrogenated oil or fat according to claim 3, wherein the oil or fat is edible vegetable oil or fat containing 10 wt. % or more of α-linolenic acid on the basis of total constituent fatty acid content.

6. An oil or fat composition containing the oxidized and partially hydrogenated oil or fat according to claim 1.

7. The oil or fat composition according to claim 6, wherein the oil or fat composition contains 0.01 to 10 wt. % of the oxidized and partially hydrogenated oil or fat.

8. A food product containing the oil or fat composition according to claim 6.

9. A food product cooked with the oil or fat composition according to claim 6.

10. A method of producing an oxidized and partially hydrogenated oil or fat containing C18:2 trans-isomer from 10 to 60 wt. % on the basis of total constituent fatty acid content and having peroxide value from 20 to 350 meq/kg, comprising:
   partially hydrogenating an oil or fat until C18:2 trans-isomer content on the basis of total constituent fatty acid content reaches 10 to 60 wt. %; and
   oxidizing the resultant partially hydrogenated oil or fat until peroxide value reaches 20 to 350 meq/kg.

11. The method according to claim 10, further comprising:
   heating the partially hydrogenated oil or fat at a temperature from 50 to 200° C.

12. The method according to claim 10, wherein the total content of linoleic acid and α-linolenic acid on the basis of the total constituent fatty acid content of the partially hydrogenated oil or fat is 10 wt. % or less.

13. The method according to claim 10, wherein the oil or fat is edible vegetable oil or fat containing 10 wt. % or more of α-linolenic acid on the basis of total constituent fatty acid content.

* * * * *